United States Patent Office 3,639,415
Patented Feb. 1, 1972

3,639,415
PHOSPHORIC ACID SALT OF 4-METHYL-5-β-CHLORO-ETHYL-THIAZOLE
Lajos Guczoghy, Mária Puklics, György Kelemen, and György Leszkovsky, Budapest, Hungary, assignors to Chinoin Gyogyszer-es Vegyeszeti Termekek Gyara RT, Budapest, Hungary
No Drawing. Filed May 4, 1966, Ser. No. 547,402
Int. Cl. C07d 91/32
U.S. Cl. 260—302 E                    1 Claim

ABSTRACT OF THE DISCLOSURE

New phosphoric acid salt of 4 - methyl - 5 - β - chloroethyl-thiazole and pharmaceutical compositions containing said salt, which are useful as sedatives, antiepleptic, hypnotics, and anticonvulsants.

---

This invention relates to pharmaceutical compositions comprising a new salt having valuable therapeutical properties. More particularly it is concerned with pharmaceutical compositions comprising the phosphoric acid salt of 4 - methyl - 5 - β - chloro - ethyl - thiazole and a process for the preparation thereof.

It is known that 4 - methyl - 5 - β - chloro - ethylthiazole and the ethane disulfonic acid salt thereof may be used in therapy as antiepileptic agent or as drug used by alcohol detoxication-cure. (Brit. Med. J. 171, (1964)).

The free base of 4 - methyl - 5 - β - chloro - ethylthiazole is an oily liquid with a disagreeable strong odour, thus it is not convenient for therapeutical application. In order to overcome said disadvantages, the different salts were prepared such as the hydrohalogenides, methane sulfonates and camphorsulfonates, the salt with ethane disulfonic acid being the commercial available form used in pharmacy. (B.P. 792,158). The production of the latter on an industrial scale is rendered difficult by the fact that ethane disulfonic acid is a hygroscopic, expensive substance the preparation and treatment of which causes inconveniences.

According to the present invention there is provided the new phosphoric acid salt of 4-methyl-5-β-chloro-ethyl-thiazole. The pharmacological activity of said salt surpasses that of the known ethane disulfonic acid salt. A further advantage of the new salt according to the present invention resides in the easier and more convenient availability and producibility of same.

The product inhibits convulsions caused by electroshock and Metrazol (Tetracor) in considerably smaller doses than the known ethane disulfonic acid salt on mice. The effective dose ($ED_{50}$) of the new phosphoric acid salt is about 1.83 times smaller than that of the ethane disulfonic acid salt commonly used. Moreover the new phosphoric acid salt proved to be very effective also in antagonising the lethal action of nicotine and in the prolongation of barbiturate induced sleep.

According to a further feature of the present invention there is provided a process for the preparation of the new phosphoric acid salt of 4-methyl-5-β-chloro-ethylthiazole which comprises reacting 4-methyl-5-β-chloro-ethyl-thiazole with phosphoric acid.

According to a prepared form of realization of the invention the 4-methyl-5-β-chloro-ethyl-thiazole base is reacted with phosphoric acid so that the acid component is used in an amount of 0.9–2 moles, preferably 1.5 moles, calculated on 1 mole of 4-methyl-5-β-chloro-ethyl-thiazole. The reaction is carried out in the presence of a solvent. Water, aliphatic alcohols, toluene, benzene, preferably ethanol may be used as solvent. The reaction may be accomplished at ambient temperature.

If the reaction is carried out in an organic solvent as medium, the product may be isolated by cooling the reaction mixture, then filtering and washing the precipitated crystalline substance. On evaporating the mother liquor further amounts of the phosphoric acid salt may be obtained as second crystallization. If the reaction is carried out in aqueous medium, a solution suitable for direct therapeutical application (e.g. injectable solutions) may be obtained.

According to micro-analytical and physico-chemical experiments the product may be illustrated by the following formula:

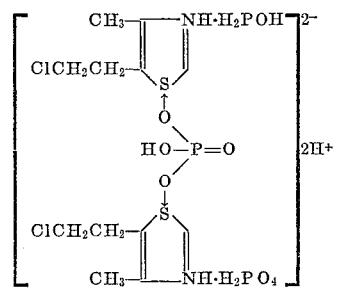

According to a still further feature of the present invention there are provided pharmaceutical compositions comprising the phosphoric acid salt of 4-methyl-5-β-chloro-ethyl-thiazole as active ingredient. Said pharmacological compositions may be prepared by admixing the phosphoric acid salt of 4-methyl-5-β-chloro-ethyl-thiazole with appropriate pharmaceutical carriers or excipients, such as starch, talc, gelatine, stearine, water, etc. and finishing the product in forms suitable for direct medical use such as tablets, coated pills, suppositories, capsules, powder mixtures, solutions, injections, suspensions, if desired after addition of additives, such as filling, wetting, sliding agents, stabilizers etc.

The pharmaceutical compositions according to the present invention may comprise further therapeutically active agents, such as sedatives, antiepileptics, hypnotics, spasmolytics, analgesics and/or muscle relaxants. Preferable representatives of such further additives are the following drugs: 5-phenyl-5-ethyl-barbituric acid 6,7,3',4'-tetramethoxy - 1 - benzyl - isoquinoline, 6,7,3',4' - tetraethoxy - 1 - benzal-1,2,3,4-tetrahydro-isoquinoline, 1,4-bis - (phenyl - isopropyl) - piperazine, 1-phenyl-2,3-dimethyl - 4 - dimethylamino-pyrazolone-5-or the sodium salt of 1 - phenyl-2,3-dimethyl-4-methylamino-methane-sulfonic acid-pyrazolone-5.

The phosphoric acid salt of 4-methyl-5-β-chloro-ethyl-thiazole may be compounded preferably in the form of tablets comprising 300–500 mg. of the active ingredient; or ampoules containing a 0.8% aqueous solution which comprises 500–800 mg./kg. doses of the active ingredient or as 500 ml. preparations suitable for infusion administration.

The advantage of the new phosphoric acid salt of 4-methyl-5-β-chloro-ethyl-thiazole resides in the fact that it exhibits more advantageous pharmacological effect and is cheaper, more readily available and producible, then the known salts.

Further details of our process are to be found in the examples. It is by no means intended to limit our invention to the specific examples, which are only given to illustrate the invention.

EXAMPLE 1

A solution of 70 g. of 85.3% phosphoric acid and 350 ml. of anhydrous ethanol is added to a solution of 65.5 g. of 4-methyl-5-β-chloro-ethyl-thiazole and 75 ml. of anhydrous ethanol, whereupon the reaction mixture is shaken thoroughly and crystallized on cooling.

The precipitated crystals are filtered off, washed with 40 ml. of anhydrous ethanol and dried. Thus 68.4 g. of the phosphonic acid salt of 4-methyl-5-β-chloro-ethyl-thiazole are obtained. On evaporating the mother-liquor under reduced pressure further 37.2 g. of the phosphoric acid salt are obtained as II. generation. The product is very readily soluble in water. The pH of the concentrated aqueous solution of same amounts to the value of 2.

*Analysis.*—(Percent): C=23.43–23.41 (calcd.: 23.4); H=4.11–4.12 (calcd.: 4.08); N=4.54–4.6 (calcd.: 4.55); Cl=11.64–11.97 (calcd.: 11.5).

The formula of the product is:

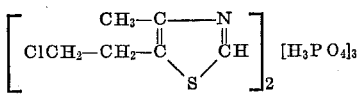

It has been found by comparing the pharmacological activity of the phosphoric acid salt with that of the known ethane disulfonic acid salt, that the salt according to the present invention possesses more advantageous therapeutical properties. The effective dose of the phosphoric acid salt inhibiting electroshock-induced seizures amounts to $ED_{50}=79$ mg./kg. if administered intraperitoneally. The corresponding value of the ethane disulfonic acid salt was found to be $ED_{50}=145$ mg./kg., thus the phosphoric acid salt is effective in 1.83 times smaller doses than the known ethane disulfonic acid salt.

The effective dose of the new phosphoric acid salt inhibiting Metrazol (tetracor)-induced seizures in mice amounts to $ED_{50}=68$ mg./kg. if administered intraperitoneally.

According to a further test the antagonism of nicotine-toxicity has been determined. The test has been carried out on mice. It has been found that mice treated wtih the product survive the intravenously injected lethal ($LD_{100}$) dose of nicotine (bitartarate). The effective dose of the product proved to be $ED_{50}=40.5$ mg./kg., if administered intraperitoneally.

The sleeping time of 2 minutes 19 seconds in mice induced by barbiturates was prolonged by 75 mg./kg. intraperitoneally administered dose of the new phosphoric acid salt to 18 minutes 53 seconds.

EXAMPLE 2

6.55 g. of 4-methyl-5-β-chloro-ethyl-thiazole are added to a solution of 7 g. of 85% phosphoric acid and 1300 ml. of water. The solution is clarified with 0.2 g. of decoloring charcoal, then filtered and finished in the form of an injectable preparation.

EXAMPLE 3

Tablets having the following composition are prepared according to the known methods of pharmaceutical industry:

| | Mg. |
|---|---|
| Phosphoric acid salt of 4-methyl-5-β-chloro-ethyl thiazole | 500 |
| Talc | 15 |
| Stearine | 10 |
| Starch | 50 |
| Gelatine | 10 |

EXAMPLE 4

The following components are compounded according to the known methods of pharmaceutical industry. The composition of one tablet is the following:

| | Mg. |
|---|---|
| Phosphoric acid salt of 4-methyl-5-β-chloro-ethyl-thiazole | 300 |
| Chloralhydrate | 200 |
| Talc | 15 |
| Stearine | 10 |
| Starch | 50 |
| Gelatine | 10 |

EXAMPLE 5

Tablets having the following composition are prepared by the known methods of pharmaceutical industry:

| | Mg. |
|---|---|
| Phosphoric acid salt of 4-methyl-5-β-chloro-ethyl-thiazole | 300 |
| 5-phenyl-5-ethyl-barbituric acid (Sevenal) | 200 |
| Talc | 15 |
| Stearine | 10 |
| Starch | 50 |
| Gelatine | 10 |

EXAMPLE 6

Injectable ampoules having the following composition are prepared according to the known methods of pharmaceutical industry:

| Phosphoric acid salt of 4-methyl-5-β-chloro-ethyl-thiazole | mg. | 800 |
|---|---|---|
| Sodiumhydrogen carbonate | mg. | 200 |
| Distilled water ad. | ml. | 100 |

What we claim is:

1. The phosphoric acid salt of 4-methyl-5-β-chloroethyl-thiazole.

References Cited

UNITED STATES PATENTS 2,328,594   9/1943   Williams et al. _____ 260—256.6
3,031,457   4/1962   Charonnat et al. _____ 260—302

ALTON D. ROLLINS, Primary Examiner

U.S. Cl. X.R.

424—199